United States Patent Office 2,736,691
Patented Feb. 28, 1956

2,736,691

SEPARATION OF AROMATIC HYDROCARBONS BY EXTRACTIVE DISTILLATION WITH PHOSPHOROUS TRIBROMIDE

William T. Nelson, Bartlesville, Okla., assignor to Phillips Petroleum Company, a corporation of Delaware No Drawing. Application October 25, 1954,
Serial No. 464,626

7 Claims. (Cl. 202—39.5)

This invention relates to an extractive distillation separation of aromatic hydrocarbons. In one of its aspects, the invention relates to the separation, by an extractive distillation, of an alkyl-substituted aromatic hydrocarbon from another employing as an entrainer phosphorus tribromide which has been found to have a preferential affinity for at least one aromatic component in a mixture of aromatic hydrocarbons boiling in the same boiling point range. In another of its aspects, the invention relates to the separation of a mono-substituted aromatic hydrocarbon, from a poly-substituted aromatic hydrocarbon having a similar or close boiling point, by the employment of a phosphorus tribromide entrainer in an extractive distillation process. In the specific embodiment of the invention which is considered below, a xylene is removed from ethylbenzene, employing phosphorus tribromide as as extractive distillation entrainer.

Other aspects, the objects, and the advantages of the invention are apparent from this disclosure and the appended claims.

In the various ways of treating hydrocarbons, there will frequently be encountered mixtures of closely related aromatic hydrocarbons which are difficult to separate into specific components by known procedures. This is especially true of certain mixtures of commonly occurring substituted aromatic hydrocarbons such as the xylenes and ethylbenzene. The components in these mixtures have the same number of carbon atoms per molecule and similar physical properties so that the separation of these hydrocarbon mixtures into reasonably pure hydrocarbons cannot readily be obtained by conventional fractionation processes. Also, other methods of separation based on chemical reaction or other methods of separation usually involve physical steps which are expensive, require special apparatus and reagents, and involve difficult manipulative techniques which achieve only a relatively small yield of an impure product.

According to the present invention, it has been found that at least one specific aromatic hydrocarbon can be separated from a mixture of aromatic hydrocarbons having similar boiling point range, and more specifically, that a mono-substituted aromatic hydrocarbon can be separated from at least one poly-substituted aromatic hydrocarbon of the same number of carbon atoms and boiling point range when a mixture containing said hydrocarbons is subjected to an extractive distillation in presence of phosphorus tribromide.

In extractive distillation processes, the separation of close-boiling aromatic hydrocarbons is based on the change in relative volatility of the hydrocarbons obtained by the addition of an entrainer so that at least one of the components of the hydrocarbon mixture can be separated by fractional distillation.

The separation process of this invention is usually carried out as a continuous process, with the ethylbenzene distilling overhead and para-xylene and phosphorus tribromide solvent being recovered as the residual fraction.

The phosphorus tribromide is recovered from the bottoms in the extractive distillation process by a subsequent separation step such as low temperature phase separation, fractional distillation, solvent extraction, or the like and recycled to the separation step.

The separation of phosphorus tribromide from hydrocarbons by solvent extraction is somewhat difficult because of the reactivity of the phosphorus tribromide with many potential solvents; however, dimethyl sulfate is an effective solvent for this separation. The separation of phosphorus halides from hydrocarbons by solvent extraction employing dimethyl sulfate is set forth, described and claimed, in copending application for patent, Serial Number 477,840, filed December 27, 1954, by Gardner C. Ray.

The proportions of phosphorus tribromide employed in the separation process will vary considerably and depend on the concentration, and the nature of the components in the mixture to be separated, the purity of the recovered products desired, and the design and operation of the distillation equipment. Some of the physical properties of the phosphorus tribromide entrainer, used in the example, are given in Table I.

TABLE I

*Physical properties of phosphorus tribromide*

| | |
|---|---|
| Molecular weight | 270.73 |
| Boiling point, C | 172.9 |
| Boiling point, F | 343.2 |
| Melting point, C | —40.0 |
| Melting point, F | —40.0 |
| Specific gravity, 15/4 | 2.852 |

EXAMPLE

A blend of 50 volume percent ethylbenzene and 50 volume percent paraxylene was subjected to simple batch distillation in the presence, and in the absence, of phosphorus tribromide in a 13 mm. Hypercal column having an estimated 40 theoretical trays. The data for these separations are given in Table II.

TABLE II

*Distillation of ethylbenzene and para-xylene*

| Entrainer | Charge, ml. | | Cut No. | Boiling Range,[a] °C. | Hydrocarbon Yield in Distillate, Vol. Percent | Ethylbenzene Purity in Distillate, Vol. Percent |
|---|---|---|---|---|---|---|
| | Hydrocarbon Blend | Entrainer | | | | |
| PBr₃ | 50.0 | 30.0 | 1 | 135.2–136.8 | 14.8 } 29.8 | 84.5 } 81.3 |
| | | | 2 | 136.8–136.9 | 15.0 | 78.2 |
| None | 48.1 | 0 | 1 | 136.1–136.5 | 29.2 | 75.2 |

[a] Corrected to 760 mm. Hg.

In a one-stage extractive distillation set-up, the relative volatility of ethylbenzene over para-xylene was found to be 1.09 in the presence of an equal volume of phosphorus tribromide at 150° C. In the absence of phosphorus tribromide, the calculated relative volatility was found to be 1.06.

The foregoing data clearly demonstrate that phosphorus tribromide is useful as an extractive distillation entrainer for the separation of close-boiling aromatic hydrocarbons, especially alkyl-substituted aromatic hydrocarbons.

Reasonable variation and some modification are possible within the scope of the foregoing disclosure and the appended claims to the invention, the essence of which is that phosphorus tribromide has been found to be useful as an extractive distillation entrainer for the separation of aromatic hydrocarbons having close boiling points, especially alkyl-substituted aromatic hydrocarbons, substantially as set forth and described herein.

I claim:

1. The extractive distillation separation of close-boiling aromatic hydrocarbons which comprises admixing with said hydrocarbons as an extractive distillation entrainer phosphorus tribromide and then subjecting the admixture to distillation.

2. The extractive distillation of close-boiling alkyl-substituted aromatic hydrocarbons which comprises admixing same with phosphorus tribromide and subjecting the admixture thus obtained to an extractive distillation.

3. The separation of mono-alkyl-substituted aromatic hydrocarbons from poly-alkyl-substituted aromatic hydrocarbons which comprises admixing said hydrocarbons with phosphorus tribromide as an extractive distillation entrainer and subjecting the mixture thus obtained to an extractive distillation.

4. The extractive distillation separation of ethylbenzene and paraxylene which comprises admixing with said hydrocarbons phosphorus tribromide and subjecting the said admixture thus obtained to an extractive distillation.

5. The extractive distillation separation of para-xylene from ethylbenzene which comprises admixing approximately 30 volumes of phosphorus tribromide for each 50 volumes of the hydrocarbon admixture with said hydrocarbon admixture and then subjecting the final admixture thus obtained to an extractive distillation.

6. The extractive distillation separation of a mixture of ortho-, meta-, and para-xylenes from ethylbenzene which comprises admixing the said mixture of hydrocarbons with phosphorus tribromide and subjecting the final admixture thus obtained to an extractive distillation.

7. The extractive distillation separation of ethylbenzene from a mixture containing at least one xylene which comprises admixing the said mixture of hydrocarbons with phosphorus tribromide and subjecting the admixture thus obtained to an extractive distillation.

References Cited in the file of this patent

UNITED STATES PATENTS

| | | |
|---|---|---|
| 2,246,257 | Kohn | June 17, 1941 |
| 2,630,406 | Linn | Mar. 3, 1953 |